(12) United States Patent
Orellana et al.

(10) Patent No.: US 9,725,047 B2
(45) Date of Patent: Aug. 8, 2017

(54) LOUDSPEAKER ARRANGEMENT IN A VEHICLE

(71) Applicant: FORD GLOBAL TECHNOLOGIES, LLC, Dearborn, MI (US)

(72) Inventors: Fernando Mar Orellana, Benito Juarez (MX); Alvaro Sanchez Canudas, Naucalpan (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/746,552

(22) Filed: Jun. 22, 2015

(65) Prior Publication Data

US 2016/0368430 A1 Dec. 22, 2016

(51) Int. Cl.
*B60R 11/02* (2006.01)
*B60R 11/00* (2006.01)

(52) U.S. Cl.
CPC ... *B60R 11/0217* (2013.01); *B60R 2011/0019* (2013.01); *H04R 2499/13* (2013.01)

(58) Field of Classification Search
CPC .................................................. B60R 11/0217
USPC .................. 381/71.2, 86, 191, 303, 389
See application file for complete search history.

(56) References Cited

U.S. PATENT DOCUMENTS

| | | | |
|---|---|---|---|
| 5,754,664 A * | 5/1998 | Clark .................. | B60R 11/0217 296/214 |
| 6,137,891 A | 10/2000 | Porrazzo et al. | |
| 6,377,695 B1 | 4/2002 | Azima et al. | |
| 8,848,938 B2 * | 9/2014 | Opfer ....................... | H04R 5/02 381/71.2 |
| 2004/0141625 A1 * | 7/2004 | Leipold ............... | B60R 11/0217 381/86 |
| 2005/0140167 A1 * | 6/2005 | Jaggi ................... | B60R 13/0243 296/146.7 |

(Continued)

FOREIGN PATENT DOCUMENTS

| | | |
|---|---|---|
| DE | 102008007129 A1 | 8/2009 |
| GB | 2504691 B | 1/2015 |
| JP | 3808015 B2 | 8/2006 |

OTHER PUBLICATIONS

Carmakers start to tap flat-panel speakers http://europe.autonews.com/article/20071001/ANE/70928002/carmakers-start-to-tap-flat-panel-speakers.

(Continued)

*Primary Examiner* — Gerald Gauthier
(74) *Attorney, Agent, or Firm* — James P. Muraff; Neal, Gerber & Eisenberg LLP

(57) ABSTRACT

Embodiments include a loudspeaker arrangement in a vehicle comprising a plurality of loudspeakers positioned in a pillar of the vehicle. The pillar is coupled to at least one vehicle door frame and extends from a vehicle roof to a vehicle floor, and at least one of the plurality of loudspeakers is a low-frequency loudspeaker. In some embodiments, the pillar is a B-pillar of the vehicle, and/or the low-frequency loudspeaker is a sub-woofer. Other embodiments include a vehicle comprising at least one door frame, a pillar coupled to the at least one door frame and extending from a vehicle roof to a vehicle floor, and a low-frequency loudspeaker mounted in the pillar. In some embodiments, the vehicle further includes at least one boxless loudspeaker mounted in the pillar, and each of the at least one boxless loudspeaker is an electrostatic loudspeaker.

17 Claims, 3 Drawing Sheets

(56) References Cited

U.S. PATENT DOCUMENTS

| | | | | |
|---|---|---|---|---|
| 2005/0152562 A1* | 7/2005 | Holmi | | H04S 7/307 |
| | | | | 381/86 |
| 2005/0259831 A1* | 11/2005 | Hutt | | H04R 1/345 |
| | | | | 381/86 |
| 2007/0052219 A1* | 3/2007 | Rust | | B60R 21/0428 |
| | | | | 280/730.2 |
| 2007/0116298 A1* | 5/2007 | Holmi | | H04R 5/02 |
| | | | | 381/86 |
| 2007/0154055 A1* | 7/2007 | Nichols | | B60R 11/0217 |
| | | | | 381/389 |
| 2007/0220811 A1* | 9/2007 | Flendrig | | B60J 5/0416 |
| | | | | 49/352 |
| 2007/0236032 A1* | 10/2007 | Osada | | B60R 21/0428 |
| | | | | 296/1.08 |
| 2008/0037794 A1* | 2/2008 | Sugawara | | H04R 5/023 |
| | | | | 381/1 |
| 2009/0016552 A1* | 1/2009 | Medley | | H04R 19/02 |
| | | | | 381/191 |
| 2010/0150389 A1* | 6/2010 | Sumiyama | | H04R 1/22 |
| | | | | 381/386 |
| 2014/0029773 A1* | 1/2014 | Kano | | H04R 17/00 |
| | | | | 381/190 |
| 2014/0133673 A1* | 5/2014 | Silzle | | H04R 3/12 |
| | | | | 381/86 |
| 2014/0348354 A1* | 11/2014 | Christoph | | H04R 29/001 |
| | | | | 381/303 |
| 2015/0256912 A1* | 9/2015 | Nedelman | | B60R 11/0217 |
| | | | | 381/389 |
| 2016/0368430 A1* | 12/2016 | Orellana | | B60R 11/0217 |
| 2017/0088053 A1* | 3/2017 | Orellana | | B60Q 9/008 |

OTHER PUBLICATIONS

Jaguar's New C-XF Car Purrs Like a Kitten . . . Or Does It? http://www.dealerscope.com/article/jaguars-new-c-xf-car-purrs-like-a-kittenor-does-it-45525/1/.

* cited by examiner

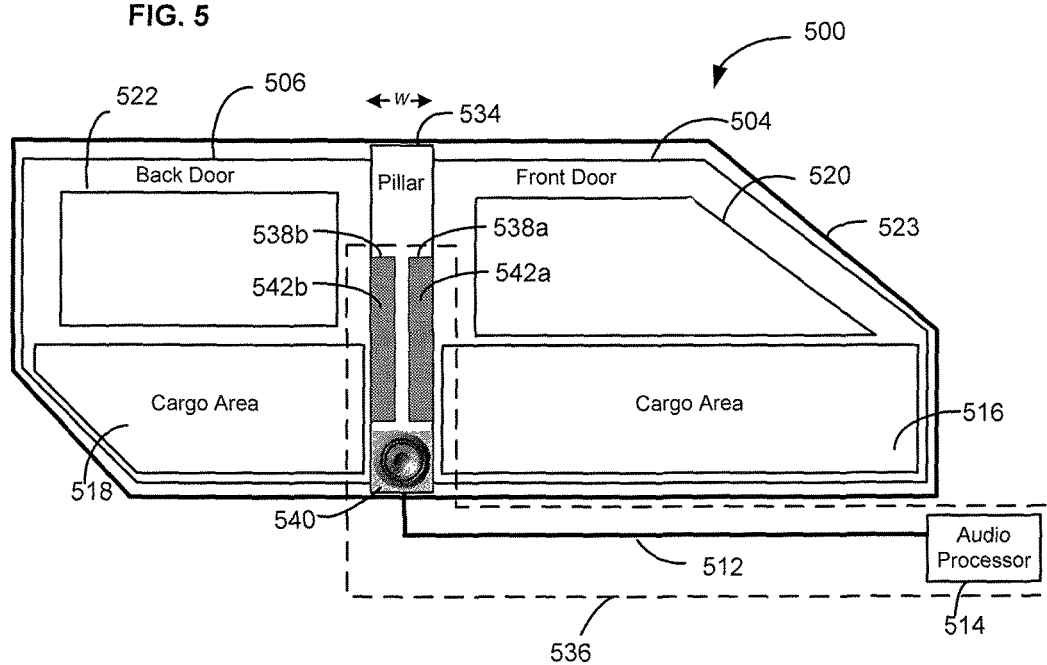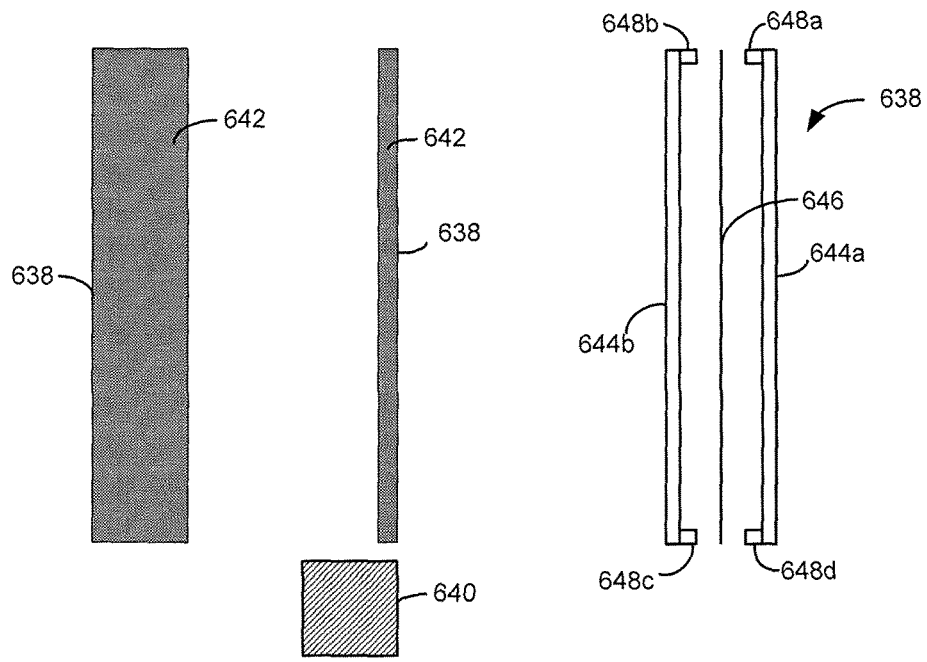

LOUDSPEAKER ARRANGEMENT IN A VEHICLE

TECHNICAL FIELD

This application generally relates to vehicle sound systems and more specifically, to vehicle sound systems with one or more boxless speakers and a woofer.

BACKGROUND

Conventional vehicle sound systems can include a plurality of dynamic or pistonic loudspeakers positioned at select locations throughout an interior or cabin of the vehicle. Such loudspeakers are known as "box speakers" because they typically comprise a rectangular- or square-shaped box enclosing one or more dynamic transducers (also known as "drivers"). Most box enclosures have an appreciable depth to accommodate the transducer(s) therein, which typically include a rigid basket or frame coupled to a cone diaphragm that is driven by a large magnet.

Given this depth, there are only a few locations within a typical vehicle interior that can accommodate box speakers. Some common speaker locations include the dashboard at the front of the vehicle interior, one or more doors on either side of the vehicle, or the parcel shelf located at the rear of the vehicle. In the case of low-frequency loudspeakers (e.g., woofer or sub-woofer), which are typically larger in size than middle or high frequency speakers (e.g., mid-range or tweeter), the speakers may be located in a trunk compartment of the vehicle, which can readily accommodate the larger speakers, albeit at the cost of cargo space within the trunk.

As an example, FIG. 1 illustrates a conventional loudspeaker arrangement that may be found in an existing vehicle 100 (e.g., a four-door sedan). As shown, the vehicle 100 includes a sound system comprising a plurality of conventional box speakers 102 positioned at various locations on front and back doors 104, 106 of the vehicle 100. As will be appreciated, the depicted doors 104, 106 constitute only one side of the vehicle 100, and an opposite side of the vehicle (not shown) may be a mirror image of the doors 104, 106 and may include additional box speakers 102 located in similar locations. As is conventional, the sound system of the vehicle 100 also includes a low-frequency loudspeaker 108, or woofer, located in a trunk 110 of the vehicle 100.

One drawback of conventional vehicle sound systems is the amount of wiring and manufacturing complexity required as a result of placing each of the loudspeakers 102 and the woofer 108 in discrete locations throughout the vehicle 100. For example, as shown, each of the loudspeakers 102 and the woofer 108 is electrically connected to an audio processor 114 of the vehicle sound system by a separate one of a plurality of cable harnesses 112. Further, each of the multiple cable harnesses 112 has a different length and/or follows a different path across the vehicle 100, thereby increasing the wiring complexity of the vehicle sound system.

Another drawback of the conventional vehicle sound systems is the reduction in cargo space caused by placing the speakers 102 within the doors 104, 106 and placing the woofer 108 in the trunk 110. As used herein, the terms "cargo area" or "cargo space" refers to user-accessible storage space within the passenger cabin and/or trunk of the vehicle and may include or form a pocket, compartment, cup holder, or other storage receptacle. As shown in FIG. 1, for example, each of the doors 104 and 106 includes a conventional cargo area 116, 118 within a lower half of the door below respective windows 120, 122. Like the woofer 108, which occupies valuable trunk space, the loudspeakers 102 integrated into the doors 104, 106 can reduce or limit the amount of available cargo area 116, 118 in each door. For example, as shown in FIG. 1, the cargo areas 116, 118 are carved out of the space that is not occupied by the box speaker 102. As will be appreciated, though not shown here, the space highlighted as cargo areas 116, 118 may also include one or more lights, handles for opening and/or closing the respective vehicle door, and buttons, knobs, levers, or the like for controlling the vehicle window(s), door lock(s), and/or side mirrors, as is conventional.

To further illustrate the available cargo area in a conventional vehicle door, FIG. 2 shows a cross-sectional side view of a lower portion of the back vehicle door 106. As will be appreciated, a cross-sectional view of the front vehicle door 104 may be substantially similar to the view shown in FIG. 2. In FIG. 2, the door 106 includes an interior door panel 124 coupled to an exterior side 126 of the door 106, and the door panel 124 comprises an internal storage compartment, or cargo area 118. The cargo area 118 is defined or formed by a cavity between an interior wall 128 of the door panel 124 that is coupled to the exterior side 126 of the door 106, and an exterior wall 130 that extends out from a base 132 of the panel 124 towards the passenger or cabin compartment of the vehicle 100. In accordance with the conventional speaker arrangement shown in FIG. 1, box speaker 102 is mounted to the interior wall 128 of the door panel 124, thereby reducing a size of the available cargo space 118 by at least a volume of the box speaker 102.

Existing solutions to the above-noted problems include placing flat or low profile speakers in a roof the vehicle. For example, U.S. Pat. No. 8,848,938 describes integrating electrostatic planar speakers into a roofliner of the vehicle, so that the roofliner itself is formed from the panel material of the planar loudspeaker. As another example, Japanese Patent No. 3808015 describes placing a distributed mode, flat panel loudspeaker just behind the headliner in a roof of a vehicle and using the headliner as the speaker cover. The Japanese patent also describes integrating the flat panel speakers into alternative locations, including the door trims, the pillar garnish, and the instrument panel. In another example, U.S. Pat. No. 6,377,695 describes placing distributed mode, panel speakers in the roof lining above the passenger compartment of a vehicle, where the acoustic radiator of each speaker is attached directly to an underside of the roof lining.

However, these existing solutions have several drawbacks, including a lack of bass or low-frequency response from both the electrostatic speakers and the distributed mode, flat panel speakers. As a result, such vehicle sound systems will typically still include a conventional subwoofer, or other box loudspeaker for handling low-frequencies, that can only be accommodated in the trunk of the vehicle due to its sheer size and the above-noted space constraints in the passenger compartment. Accordingly, even though existing solutions may increase cargo space in the passenger cabin, a portion of the trunk space may still be occupied by the vehicle sound system.

SUMMARY

The invention is intended to solve the above-noted problems by providing a loudspeaker arrangement that is designed to, among other things, provide a low-frequency speaker (e.g., a sub-woofer) in a pillar of the vehicle and provide one or more middle- or high-frequency loudspeakers in either the pillar or the door trim panels of the vehicle.

For example, one embodiment provides a loudspeaker arrangement in a vehicle comprising a plurality of loudspeakers positioned in a pillar of the vehicle. The pillar is coupled to at least one vehicle door frame and extends from a vehicle roof to a vehicle floor, and at least one of the plurality of loudspeakers is a low-frequency loudspeaker. In embodiments, the pillar is a B-pillar of the vehicle, and the low-frequency loudspeaker is a sub-woofer. In some embodiments, the plurality of loudspeakers further includes at least one electrostatic loudspeaker.

Another example embodiment provides a vehicle comprising at least one door frame, a pillar coupled to the at least one door frame and extending from a vehicle roof to a vehicle floor, and a low-frequency loudspeaker mounted in the pillar. In embodiments, the pillar is a B-pillar, and the low-frequency loudspeaker is a sub-woofer. In some embodiments, the vehicle further includes at least one boxless loudspeaker mounted in the pillar. In such embodiments, the vehicle further includes a cable harness electrically coupling an audio processor to the low-frequency loudspeaker and the at least one boxless loudspeaker. In other embodiments, the vehicle further includes at least one door coupled to the at least one vehicle door frame and a boxless loudspeaker mounted in a door trim panel of each of the at least one door. In either case, each boxless loudspeaker can be an electrostatic loudspeaker.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 5 is a graphical depiction of another example loudspeaker arrangement for a vehicle sound system of a vehicle in accordance with certain embodiments.

FIG. 6 is a front view of an example boxless loudspeaker in accordance with certain embodiments.

FIG. 7 is a side view of the example boxless loudspeaker shown in FIG. 6 and an example box speaker in accordance with certain embodiments.

FIG. 8 is a cross-sectional view of the example boxless loudspeaker shown in FIG. 7 in accordance with certain embodiments.

DETAILED DESCRIPTION OF EXAMPLE EMBODIMENTS

Figure 1:
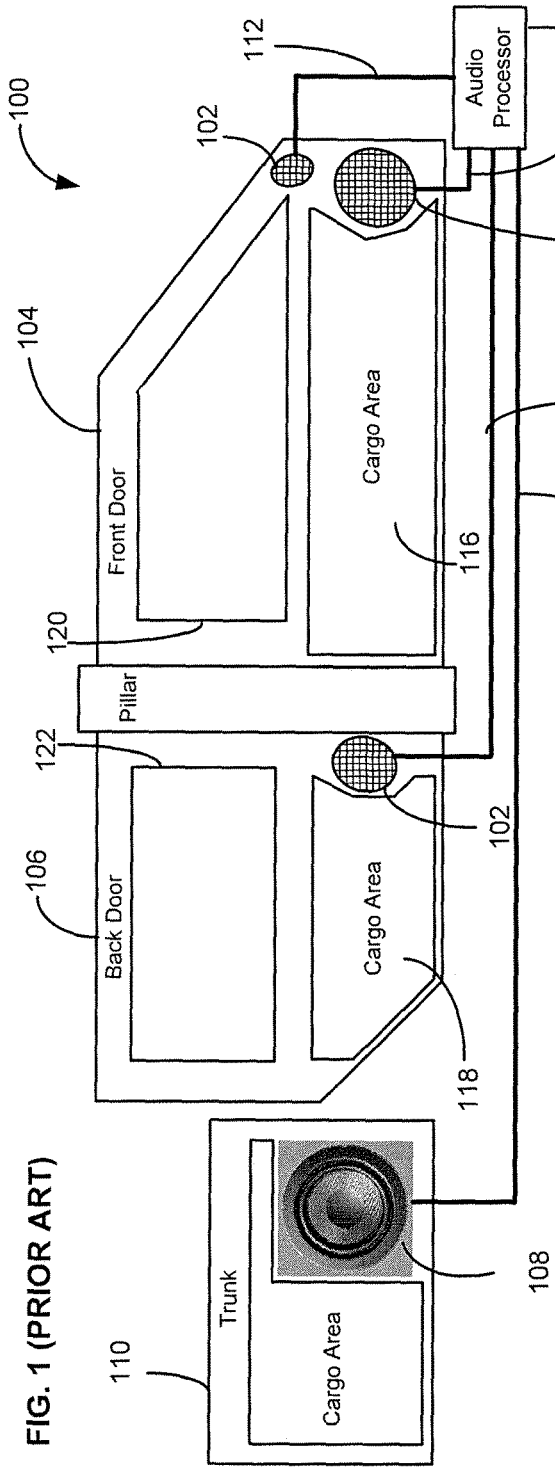
FIG. 1 is a graphical depiction of a conventional loudspeaker arrangement in a conventional vehicle.
Figure 2:
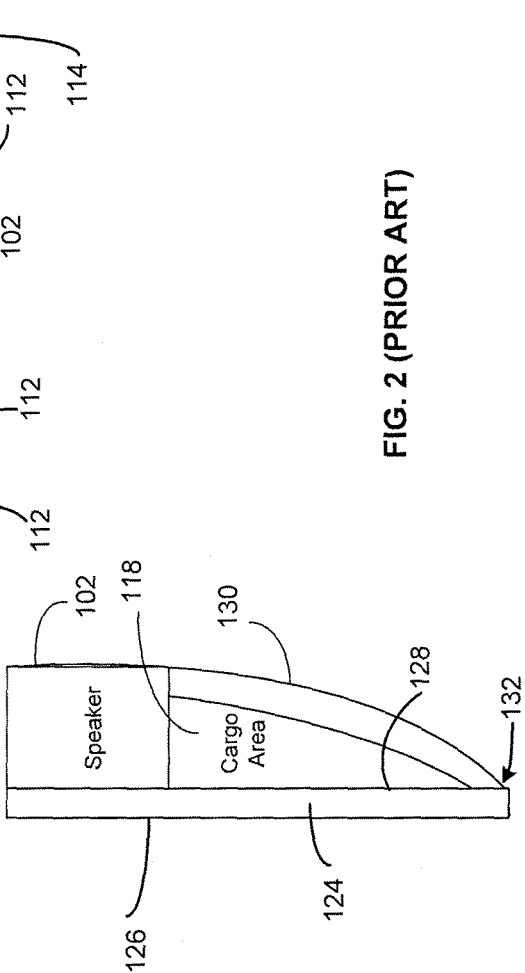
FIG. 2 is a cross-sectional view of a side of a door in the conventional vehicle of FIG. 1.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

Figure 3:
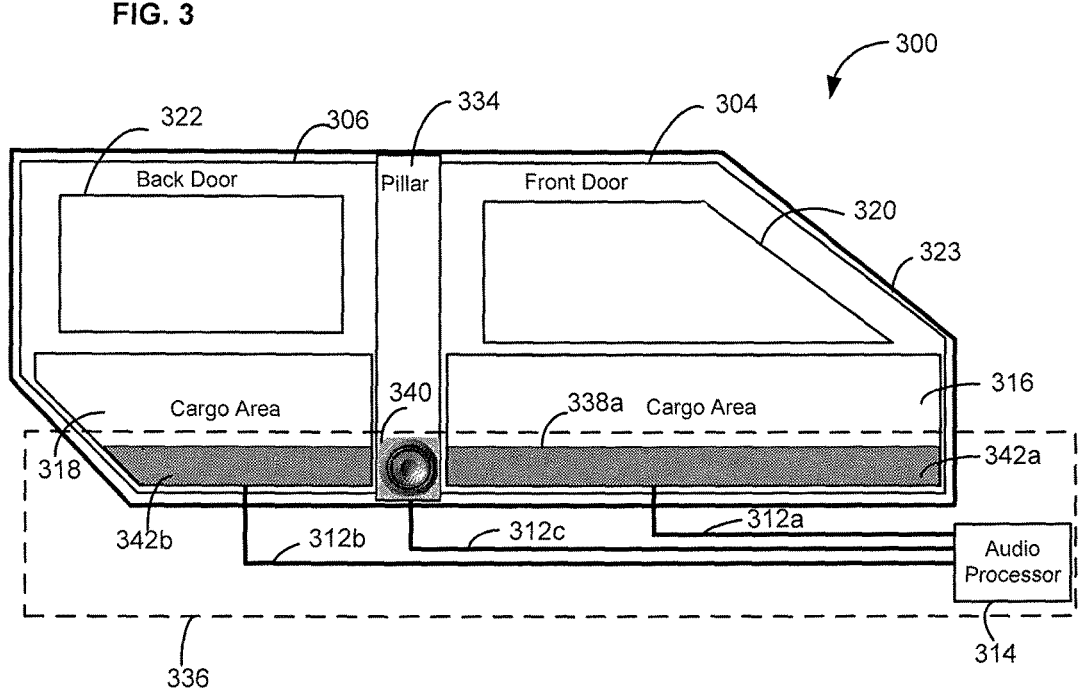
FIG. 3 is a graphical depiction of an example loudspeaker arrangement for a vehicle sound system of a vehicle in accordance with certain embodiments.

FIG. 3 illustrates an example speaker arrangement for a vehicle 300 in accordance with embodiments. As shown, the vehicle 300 includes a front door 304 and a back door 306. Each of the doors 304, 306 includes a respective cargo area 316, 318 and a respective window 320, 322. The vehicle 300 further includes a door frame 323, each of the doors 304, 306 being configured to be mounted to the door frame 323 using one or more hinges (not shown). As will be appreciated, FIG. 3 only shows one side of the vehicle 300, and an opposite side of the vehicle 300 may be a mirror image of or at least substantially similar to, the depicted side. Further, while the illustrated embodiments show the vehicle 300 as a four-door sedan, in other embodiments the vehicle 300 may have other car body styles, including, but not limited to, two-door sedan, coupe, convertible, three-door hatchback, five-door hatchback, station wagon, limousine, sport utility vehicle (SUV), multi-purpose vehicle, minivan, van, and pickup truck.

Figure 4:
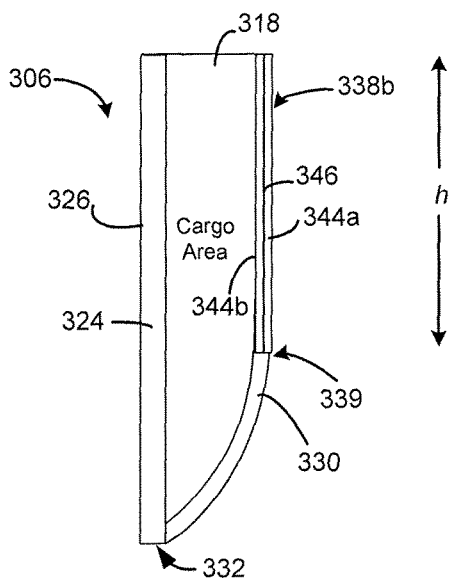
FIG. 4 is a cross-sectional view of a side of an example door in the vehicle of FIG. 3 in accordance with certain embodiments.

FIG. 4 depicts a cross-sectional view of an exemplary lower portion of the back door 306 in accordance with embodiments. As shown, the back door 306 includes an interior door panel 324 (also referred to as "door trim" or "trim panel" herein) coupled to an exterior side 326 of the vehicle door 306. As will be appreciated, the exterior side 326 of the door 306 is typically made of steel or other appropriate metal, to match an exterior of the vehicle 300. The interior door panel 324 can be made of plastic, metal, wood, fabric, leather, vinyl, and/or any other suitable material, to add to the overall aesthetic appeal of the vehicle interior and provide a sense of coziness and comfort to the passenger compartment (or cabin) of the vehicle 100. The interior door panel 324 can also include several functional and/or ergonomic parts, including one or more internal storage compartments (e.g., the cargo area 318), as well as parts that are not shown, including, for example, an armrest, a door handle, various lights and/or switches, and electronic systems for controlling the window 322 and a locking mechanism of the door 306. As shown in FIG. 4, the cargo area 318 can be defined by, or formed from, a cavity between an internal wall 328 of the door panel 324 that is coupled to the exterior side 326 of the back door 306 and an external wall 330 of the door panel 324 that extends out from a base 332 of the door panel 324 towards the passenger compartment of the vehicle 300. As will be appreciated, a cross-sectional view of the front vehicle door 304 may be substantially similar to the view shown in FIG. 4.

Referring back to FIG. 3, the vehicle 300 further includes a pillar 334 that structurally supports at least one portion of a body of the vehicle 300. In a preferred embodiment, the pillar 334 may be a "B-pillar" of the vehicle 300 that extends from a roof of the vehicle 300 to a floor of the vehicle 300 and is welded in place to structurally support the roof of the vehicle 300. In some embodiments, the pillar 334 (also referred to as a "center pillar") is generally located at a center of the vehicle 300, for example, where the vehicle 300 is a sedan, as shown in FIG. 3. In other embodiments, the pillar 334 may be located behind the front door 304 towards a rear of the vehicle 300, for example, where the vehicle is a coupe or the like. While the pillar 334 itself may be made of steel or other metal, like the rest of the vehicle body, the pillar 334 can include an exterior trim panel (not shown) that is similar in aesthetics (e.g., color, material, etc.) to the door panel 324, so as to provide a cohesive appearance for the vehicle interior. For example, the trim panel of the pillar 334 may be made of plastic, leather, and/or fabric that matches at least a portion of the door trim panel 324.

According to embodiments, the pillar 334 can further include one or more latches, hinges, fasteners, and/or the like (not shown) for coupling one or more doors of the vehicle 300 thereto. In the illustrated embodiment, the pillar 334 is coupled to the door frame 323 between the front and back doors 304, 306, and includes fasteners (not shown) for latching the front door 304 and hinges (not shown) for hanging the back door 306. This may be the case where, for example, the vehicle 300 is a sedan, a station wagon, or a five-door hatchback. In other embodiments, for example, where the vehicle 300 is a coupe or three-door hatchback, the pillar 334 may be coupled to the door frame 323 behind the front door 304 and may only include fasteners for latching the front door 304.

While the illustrated embodiment only shows one pillar 334, the vehicle 300 may include additional pillars (not shown) depending on the body type of the vehicle 300. For example, in embodiments where the vehicle 300 is a four-door sedan, the vehicle 300 may include, in addition to the B-Pillar 334, an "A-pillar" that is configured to support a front windshield (not shown) of the vehicle 300 and a "C-Pillar" that supports a rear window and/or latches the back door 306 of the vehicle 300. In some embodiments, for example, where the vehicle 300 is a station wagon, the vehicle 300 may include an A-Pillar, the B-pillar 334, a C-pillar, and a "D-Pillar" at the rear of the vehicle to support a rear windshield of the vehicle. In other embodiments, for example, where the vehicle 300 is a limousine, the vehicle 300 may include multiple B-Pillars (e.g., B1-Pillar, B2-Pillar, etc.), in addition to the A-Pillar, the C-Pillar, and/or the D-Pillar. It will be appreciated that the principles disclosed herein are not limited to the B-Pillar implementation shown in FIG. 3 and that in some embodiments, the pillar 334 may be any one of the pillars in the vehicle 300.

Referring back to FIG. 3, in embodiments, the vehicle 300 further includes a vehicle sound system 336 comprising an audio processor 314 coupled to a plurality of loudspeakers 338 configured for middle and/or high frequencies (e.g., tweeters or mid-range speakers), and at least one low-frequency loudspeaker 340 (also referred to herein as a "sub-woofer" or "woofer"). The audio processor 314 can be configured to receive audio signals from one or more audio sources (not shown), including, for example, car stereo, Global Positioning System (GPS) device, radio, compact disc player, MP3 player, mobile phone, or any other audio source coupled to or included in the vehicle sound system 336. The audio processor 314 plays the received audio signals through the loudspeakers 338, 340. In embodiments, the audio processor 336 may be configured to process the received audio signals using digital signal processing (DSP) or other audio signal processing in order to produce a desired sound output for the vehicle sound system 336, including, for example, creating a preset number of audio channels and/or performing audio balancing, fading, and/or directing with respect to a driver's seat, or the front, back, center, and/or other sections of the vehicle 300.

In the illustrated embodiment of FIG. 3, the at least one low-frequency loudspeaker 340 is mounted in the pillar 334, while the remaining loudspeakers 338 are integrated into the external wall 330 of the door panel 324 in each of the doors 304, 306 (as described in more detail below). In such embodiments, by moving the at least one low-frequency loudspeaker 340 to the pillar 334, a trunk (not shown) of the vehicle 300 can have increased cargo space, as compared to the conventional vehicle 100 where the sub-woofer 108 occupies at least a portion of the trunk 110, as shown in FIG. 1. Likewise, by moving the loudspeakers 338 to the external wall 330 of the door panel 324, the doors 304, 306 can have increased cargo space at least between the internal wall 328 and the loudspeaker 338, as compared to the conventional vehicle 100 where the box loudspeakers 102 occupy at least a portion of the cargo space 116, 118 in the respective doors 104, 106, as shown in FIG. 1.

In embodiments, the low-frequency loudspeaker 340 is a reduced sub-woofer that has a smaller, narrower, and/or more compact enclosure that is capable of fitting at a base, or inside a lower portion, of the pillar 334 of the vehicle 300. In embodiments, the low-frequency loudspeaker 340 comprises a box-shaped enclosure housing a dynamic transducer that is dedicated to the reproduction of low-pitched audio frequencies known as "bass" (e.g., 20-200 Hertz (Hz)). The low-frequency loudspeaker 340 can be included in the vehicle sound system 336 in order to augment (or add bass response to) the frequency range of the loudspeakers 338, which can be configured to cover higher frequencies. Examples of existing reduced sub-woofers that may be adapted for use in accordance with the principles described herein can include Alpine PWE-S8, Artison RCC Nanol, and Pioneer TS-WH500A.

According to embodiments, the low-frequency loudspeaker 340 can be integrated into the pillar 324, so as to form at least a portion of the trim panel (not shown) of the pillar 324, as shown in FIG. 3. In some cases, a single material, such as the vehicle headliner (e.g., a fabric) or another material (e.g., a plastic), may serve as a front face or speaker cover (not shown) of the sub-woofer 340, as well as form the trim panel of the pillar 324. In other cases, the trim panel of the pillar 324 may be formed from a combination of two or more materials, including the speaker cover of the sub-woofer 324 (e.g., fabric or mesh) and another material (e.g., plastic) for covering a remainder of the pillar trim panel. By integrating the sub-woofer 340 into the pillar 334, and repurposing or dedicating at least a portion of the pillar trim panel as the speaker cover of the sub-woofer 340, there is achieved a reduction in the overall materials and weight of the vehicle 300.

Likewise, in embodiments, the loudspeakers 338a, 338b may be installed in the door panel 324 of each of the doors 304, 306, respectively, so as to form at least a portion of each door panel 324. In embodiments, the loudspeakers 338 can include one or more electrostatic transducers, flat panel speakers, or other planar loudspeakers that are capable of being wholly integrated into, or replacing at least a portion of, a wall of the door panel 324 itself. For example, FIG. 4 shows the loudspeaker 338b attached to the external wall 330 at a point 339 located in the lower portion of the door panel 324 (e.g., close to the vehicle floor). Above this point 339, the loudspeaker 338b can replace the external wall 330 of the door panel 324 for at least a height h of the loudspeaker 338b, as shown in FIG. 4. That is, the loudspeaker 338b can form a portion of the external wall 330 that is substantially equal in height to the height h of the loudspeaker 338b. The exact height h of each loudspeaker 338 may be pre-determined based on, for example, the design and arrangement of the door trim panel 324 and/or a length of the door 304, 306 (e.g., the distance from the A-Pillar to the B-Pillar in the case of the front door 304, or the distance from the B-Pillar to the C-Pillar in the case of the rear door 306), where the height h of the loudspeaker 338 is proportional to the length of the loudspeaker 338. As will be appreciated, the front door 304 may have a configuration that is similar to that shown in FIG. 4, where the loudspeaker 338a forms a portion of the door panel (not shown) of the front door 304.

In some embodiments, the external wall 330 ends at point 339, for example, so that the loudspeaker 338b forms a remainder of the wall that defines the storage compartment (e.g., door pocket) of the cargo area 318. In other embodiments, an upper portion (not shown) of the external wall 330 may be visible above the respective loudspeakers 338 on each door panel 324. In the illustrated embodiment, the external wall 330 is visible below the point 339 on the door panel 324, or below the loudspeaker 338b. In other embodiments, the loudspeaker 338b may extend to the base 332, such that the loudspeaker 338b attaches directly to the internal wall 326.

In the illustrated embodiment, the loudspeakers 338 have an elongated shape that extends horizontally across at least a substantial portion of the cargo areas 316, 318, respectively, in order to maximize a size of each of the loudspeakers 338. The exact shape and length of the loudspeakers 338 may be determined by the shape and dimensions of the door panel 324, the respective cargo areas 316, 318, and/or the respective doors 304, 306 affixed thereto, at the speaker installation location. For example, as shown in FIG. 3, the loudspeaker 338a has a rectangular shape to match the generally rectangular shape of the lower portion of the cargo area 316 and spans the entire length of the lower portion of the cargo area 316, while the loudspeaker 338b has a left-truncated rectangular shape to match an angled left side of the lower portion of the cargo area 318 and has a shorter length than the loudspeaker 338a due to the shorter length of the lower portion of the cargo area 318.

It will be appreciated that, while FIG. 4 shows the loudspeaker 338b installed in the lower portion of the back door 306, in other embodiments, the loudspeakers 338 may be integrated into other areas of the door panel 324, including, for example, a middle section, an upper portion, or any other area in between, depending on the placement and/or configuration of the storage compartments and other elements of the cargo areas 316, 318. Further, while FIG. 3 shows the loudspeakers 338 as having elongated shapes that extend horizontally across a substantial portion of respective doors 304, 306, in other embodiments, either one of the loudspeakers 338 may have a different shape (e.g., square, triangle, circle, polygon, etc.) that extends vertically, diagonally, or in any other direction relative to the respective cargo area 316, 318, for example, to accommodate the placement and/or configuration of the storage compartments and other elements of the cargo areas 316, 318.

In embodiments, each of the loudspeakers 338a, 338b includes a speaker cover 342a, 342b, respectively, that is visually integrated into a lower portion of the respective door panel 324 of the doors 304, 306. For example, the speaker covers 342 may be constructed of a material that is included in, or is substantially similar to, other portions of the door panel 324 (e.g., fabric, plastic, etc.) and/or may have a color that matches, or is substantially similar to, a color used in the door panel 324 or in other portions of the interior trim of the vehicle 300 (e.g., headlining, roof-lining, or the like). In some embodiment, the speaker covers 342 and the exterior wall 330 are formed from the same continuous material, so the loudspeakers 338 are completely integrated into, and invisible from a surface of, the door panel 324.

In embodiments, the vehicle sound system 336 includes at least one additional low-frequency loudspeaker (not shown) in the pillar opposite the pillar 334 and a pair of loudspeakers (not shown) on the doors opposite the doors 304, 306 (e.g., on the opposite side of the vehicle 300), such that the two sides of the vehicle 300 form mirror images of each other. In such cases, the vehicle sound system 336, using, for example, the audio processor 314, can be configured to provide an improved audio output, such as 5.1 surround sound, as the placement of the sub-woofers 340 at the two opposing pillars 334 enables the addition of at least one extra audio channel, in addition to the at least four audio channels formed by the loudspeaker 338 in each of the four doors of the vehicle 300.

The vehicle sound system 336 also includes a plurality of cable harnesses 312 for electrically coupling each of the loudspeakers 338, 340 to the audio processor 314. For example, as shown in FIG. 3, a first cable harness 312a may carry audio and/or other signals from the audio processor 314 to the first loudspeaker 338a, a second cable harness 312b may carry audio and/or other signals from the audio processor 314 to the second loudspeaker 338b, and a third cable harness 312c may carry audio and/or other signals from the audio processor 314 to the low-frequency loudspeaker 340. By placing only one loudspeaker 338 on each door 304, 306, the illustrated embodiment reduces the number of cables harnesses 312, and the related wiring complexity, of the vehicle sound system 336, as compared to the conventional vehicle sound system shown in FIG. 1 where at least some of the doors includes more than one loudspeaker 102 and a separate cable harness 112 for each loudspeaker 102.

FIG. 5 shows an example speaker arrangement for a vehicle 500 in accordance with embodiments. The vehicle 500 may be substantially similar to the vehicle 300 except for the placement of a plurality of loudspeakers 538 that are configured for a middle- and/or high-frequency audio response, similar to the loudspeakers 338. More specifically, like the vehicle 300, the vehicle 500 includes a front door 504, a back door 506, respective cargo areas 516, 518 and windows 520, 522 in each of the doors 504, 506, a door frame 523 configured for coupling to the doors 504, 506 using one or more hinges (not shown), and a pillar 534 that structurally supports at least one portion of a body of the vehicle 500. Further, as in FIG. 3, FIG. 5 only shows one side of the vehicle 500, and an opposite side of the vehicle 500 may be a mirror image of, or at least substantially similar to, the depicted side. Also, while the illustrated embodiments show the vehicle 500 as a four-door sedan, in other embodiments the vehicle 500 may have other car body styles, including, but not limited to, two-door sedan, coupe, convertible, three-door hatchback, five-door hatchback, station wagon, limousine, sport utility vehicle (SUV), multi-purpose vehicle, minivan, van, and pickup truck.

In the illustrated embodiment, the pillar 534 is a B-Pillar of the vehicle 500, like the pillar 334, and is generally located at a center of the vehicle 500, for example, where the vehicle 500 is a sedan. In other embodiments, the pillar 534 may be a B-Pillar located behind the front door 504 towards a rear of the vehicle 500, for example, where the vehicle is a coupe or the like. In still other embodiments, the pillar 534 may be any pillar included in the vehicle 500, including, for example, the A-Pillar, the C-Pillar, the D-Pillar, etc.

While the pillar 534 itself may be made of steel or other metal, like the rest of the vehicle body, the pillar 534 can include a trim panel (not shown) that is similar in aesthetics (e.g., color, material, etc.) to a door panel (not shown) of the doors 504, 506, so as to provide a cohesive appearance for the vehicle interior. For example, the trim panel of the pillar 534 may be made of a plastic, leather, and/or fabric that matches at least a portion of the door trim panel. While the illustrated embodiment only shows one pillar 534, the vehicle 500 may include additional pillars (not shown) depending on the body type of the vehicle 500.

According to embodiments, the vehicle 500 includes a vehicle sound system 536 that is similar to the vehicle sound system 336 shown in FIG. 3. For example, the vehicle sound system 536 includes a low-frequency loudspeaker 540 that is mounted in the pillar 534 and is substantially similar to the low-frequency loudspeaker 340, as well as an audio processor 514 that is substantially similar to the audio processor 314. Unlike the vehicle sound system 336, the vehicle sound system 536 includes a plurality of loudspeakers 538 mounted in the pillar 534 and a single cable harness 512 configured to transmit audio signals between the audio processor 514 and the loudspeakers 538, 540. In some embodiments, the single cable harness 512 can also carry electrical power to the loudspeakers 538, 540 from a power source (not shown) of the vehicle 500 and/or transmit data and/or control signals between components of the vehicle sound system 536. As will be appreciated, the cable harness 512 may be an assembly of wires or cables that are bound together by straps, cable ties, electrical tape, a conduit, a sleeve, and/or other mechanism in order to better secure the cables against vibrations, abrasions, moisture, or other adverse effects, as well as to decrease the risk of a short, minimize the amount of space occupied by the cables, and simplify cable installation. Thus, by requiring only one cable harness 512 on each side of the vehicle 500, the vehicle sound system 536 significantly reduces the wiring complexity of the vehicle 500, as compared to the conventional vehicle sound system shown in FIG. 1.

As shown in FIG. 5, the plurality of loudspeakers 538a, 538b can be positioned adjacent to each other above the low-frequency loudspeaker 540, so as to create a speaker array in the pillar 534. In embodiments, the loudspeakers 538 can include one or more electrostatic transducers, flat panel speakers, or other planar and/or boxless loudspeakers that are capable of being wholly integrated into, or replacing, a wall of the pillar 534, such as the pillar trim panel. The physical configuration of the loudspeakers 538 may be determined based on the shape and dimensions (e.g., width and/or length) of the pillar 534. For example, in the illustrated embodiment, the loudspeakers 538a, 538b are designed to maximize coverage of a surface of the pillar 534 by having a generally rectangular shape that conforms to the generally rectangular shape of the pillar 534. Further, each loudspeaker 538a, 538b has a width that is nearly half of a width w of the pillar 534, such that only a small gap exists between the two loudspeakers 538 when they are positioned in parallel to each other on the pillar 534. In some embodiments, the exact width of each of the loudspeakers 538 may be further determined based on the design and/or width of the pillar trim panel or any other cover for the pillar 534, and/or an available spacing in or on the pillar 534 for any packaging associated with the loudspeakers 538.

In other embodiments, the pillar 534 may comprise one large loudspeaker (not shown) that comprises a plurality of transducers underneath a single speaker cover that spans across at least a substantial portion of a width of the pillar 534. In still other embodiments, the two loudspeakers 538a, 538b can each have a larger width such that the speaker covers 542 of the loudspeakers 538a, 538b are adjoining near a middle of the pillar 534. Further, while the illustrated embodiment depicts the loudspeakers 338 as a pair of parallel rectangles, other embodiments may include different configurations and/or combinations of shapes, such as, for example, a checkered pattern of square-shaped speakers, a dispersed pattern of round-shaped speakers, etc., as may be desired to improve a sound quality of the vehicle sound system 536 and/or enhance the aesthetics of the pillar 534.

In embodiments, a speaker cover 542a, 542b of each of the loudspeakers 538 can be integrated into a surface of the trim panel of the pillar 534. In some cases, the speaker covers 542 can be made from the same material as the pillar trim panel, such that the loudspeakers 538 are visually integrated into the pillar 534. For example, a headliner of the vehicle 500 can form at least a portion of the pillar trim panel and can serve as the speaker covers 542 of the loudspeakers 338. In other cases, the trim panel of the pillar 534 can include at least two materials: the material of the speaker covers 542 and the material forming a remaining surface of the pillar 534, but a surface of the pillar 534 can still appear generally planar.

In embodiments, a speaker cover (not shown) of the low-frequency loudspeaker 540 also forms a portion of the trim panel of the pillar 534, as described with respect to the low-frequency loudspeaker 340 installed in the pillar 334. As a result, a substantial portion of the pillar trim panel can be occupied by, or formed from, the loudspeakers 538, 540. By repurposing this portion of the pillar trim panel as speaker covers, the vehicle sound system 536 reduces an amount of materials used in the vehicle 500, as compared to the conventional vehicle 100 of FIG. 1. Also, by moving the loudspeakers 538 to the pillar 534, the vehicle sound system 536 reduces a weight of the doors 504, 506, as compared to the conventional vehicle doors 104, 106 which can include more than one box speaker 102, as shown in FIG. 1.

In embodiments, the vehicle sound system 536 includes at least one additional low-frequency loudspeaker (not shown) and at least one additional pair of mid-range or high-frequency loudspeakers (not shown) in the pillar opposite the pillar 534 (e.g., on the opposite side of the vehicle 500), such that the two sides of the vehicle 500 form mirror images of each other. In such cases, the vehicle sound system 536, using, for example, the audio processor 514, can be configured to provide an improved audio output, such as 5.1 surround sound, as the placement of the sub-woofers 540 at the two opposing pillars 534 enables the addition of at least one extra audio channel, in addition to the at least four audio channels formed by the loudspeaker 538 in each of the four doors of the vehicle 500.

FIGS. 6-8 illustrate an exemplary loudspeaker 638 that may be used as the loudspeakers 338 in the vehicle 300 and/or the loudspeakers 538 in the vehicle 500, in accordance with embodiments. In embodiments, the loudspeaker 638 may be specifically configured to reproduce a middle and/or high frequency audio response, such as, for example, a mid-range loudspeaker (e.g., a speaker configured for approximately 300 to 5000 Hz) or a tweeter or high-range loudspeaker (e.g., a speaker configured for up to 25 kHz). In order to integrate the loudspeaker 638 into the door trim panel 324 or the trim panel of the pillar 534, the loudspeaker 638 may be an electrostatic loudspeaker, a flat panel, distributed mode loudspeaker, or any other type of planar loudspeaker that does not have a box enclosure for housing a dynamic or cone-shaped driver (also referred to herein as "boxless loudspeaker"). For example, as illustrated by the front and side views in FIGS. 6 and 7, the loudspeaker 638 has a flat, rectangular shape with a thin profile that allows the loudspeaker 638 to be positioned in almost any location within the vehicles 300, 500, including, for example, in place of the trim panels of the doors, pillars, dashboard, roof, and/or rear shelf.

For reference, FIG. 7 shows a side view of a low-frequency loudspeaker 640, similar to the low-frequency loudspeaker or sub-woofers 340 and 540, all of which have a box-shaped enclosure with a depth that would extend much further into, for example, the pillar 534 than would the planar loudspeaker 638. As will be appreciated, the conventional mid-range and tweeter loudspeakers 102 may have a box-shaped enclosure that is similar to that of the woofer 640 shown in FIG. 7. In such cases, the difference in depth between the boxless loudspeaker 638 and the box speaker 640 may represent the amount of additional cargo space created in a door panel by placing the loudspeaker 638 on a wall of the door panel, or removing the loudspeaker 638 from the doors altogether and placing them in the pillar, as compared to fitting conventional box speakers 102 into the door.

As shown in FIGS. 6 and 7, the loudspeaker 638 includes a speaker cover 642 that covers at least an entire front surface of the loudspeaker 638 and in some cases, at least a portion of each side surface of the loudspeaker 638. As will be appreciated, in some cases, the sides of the loudspeaker 638 may be embedded into the respective trim panel or wall to which the loudspeaker 638 is mounted, such that only the front surface of the loudspeaker 638 is visible from the passenger cabin of the vehicle.

Referring now to FIG. 8, shown is a cross-sectional side view of the loudspeaker 638 (e.g., the side shown in FIG. 7) in accordance with embodiments. In the illustrated example, the loudspeaker 638 is a planar, electrostatic loudspeaker that comprises a pair of stators 644a, 644b (also referred to as "grids") positioned in parallel to each other and relative to a diaphragm 646 (also referred to as a "membrane") that is suspended between the stators 644. The stators 644 can be flat, electrically conductive sheets of metal (such as, e.g., perforated steel), and the diaphragm 646 can be a thin, flat plastic film (such as, e.g., a polyester or PET film) coated with a conductive material (such as, e.g., graphite). The diaphragm 646 can be positioned a predetermined distance apart from each of the stators 644 in order to create a small air gap around the diaphragm 646. As shown in FIG. 8, the loudspeaker 638 can further include a plurality of non-conductive spacers 648 positioned at the inner four corners of the stators 644 to further ensure that the air gap is maintained and that the diaphragm 646 does not contact the stators 644. As shown in FIG. 8, the components of the loudspeaker 638 are not housed in a box or other enclosure, and as such, the loudspeaker 638 is referred to as having a "boxless" speaker frame.

During operation of the loudspeaker 638, sound is generated by a force that is exerted on the diaphragm 646 while it is suspended in an electrostatic field. More specifically, a uniform electrostatic field can be produced by applying an external voltage supply (not shown) to the diaphragm 646 and driving the stators 644 with an audio signal that, for example, is received through the cable harness 512 from the audio processor 514. The resulting electrostatic field is proportional to the audio signal between the two stators 644 and causes a force to be exerted on the charged diaphragm 646. This movement drives the air on either side of the diaphragm 646, thereby generating sound that reproduces the audio signal. In some cases, the loudspeaker 638 can further include a step-up transformer (not shown) to provide impedance matching.

When positioned in the trim panel of a vehicle door or pillar, the loudspeaker 638 may be positioned so that the front face shown in FIG. 6 is facing the vehicle cabin and the side face shown in FIG. 7 is at least partially integrated into the trim panel. For example, in FIG. 4, the loudspeaker 338b is an electrostatic speaker with a diaphragm 346 sandwiched between two stators 344a, 344b. The diaphragm 346 and the stators 344 are positioned parallel to the external wall 330 of the door panel 324, and a front face of the stator 344a coincides with the speaker cover 342b of the loudspeaker 338b.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:
1. A vehicle comprising:
   at least one door frame;
   a passenger cabin;
   a pillar coupled to the at least one door frame and extending from a vehicle roof to a vehicle floor;
   a low-frequency loudspeaker mounted in the pillar;
   at least one door coupled to the at least one vehicle door frame; and
   a boxless loudspeaker mounted in a door trim panel of each of the at least one door;
   wherein the door trim panel of each of the at least one door comprises a cargo space defined by a wall extending from a base of the door trim panel, the corresponding boxless loudspeaker forming at least a portion of said wall;
   wherein the boxless loudspeaker has a first side facing and defining the cargo space and a second, opposing side facing the passenger cabin.
2. A vehicle comprising:
   a passenger cabin, a door coupled to a pillar and defining a user-accessible cargo space, with an open top, between at least an outer surface of a door panel and an opposing boxless loudspeaker, wherein the boxless loudspeaker has a first side facing and defining the cargo space and a second, opposing side facing the passenger cabin.

3. The vehicle of claim 2, wherein at least a portion of the cargo space is defined directly between the boxless loudspeaker and the outer surface of the door panel.

4. The vehicle of claim 3, wherein the open top is defined directly between a top of the boxless loudspeaker and the outer surface of the door panel.

5. The vehicle of claim 4, comprising a passenger cabin, wherein the vehicle is configured such that a passenger sitting in the passenger cabin can reach through the open top and into the cargo space.

6. The vehicle of claim 3, wherein a length of the cargo space is equal to a length of the boxless loudspeaker.

7. The vehicle of claim 6, wherein the lengths are defined in a direction parallel to a major longitudinal axis of the vehicle that is parallel to a direction of travel of the vehicle.

8. The vehicle of claim 2, wherein the second side of the boxless loudspeaker is uncovered such it directly defines a portion of the passenger cabin.

9. The vehicle of claim 2, wherein when viewed from the passenger cabin, the second side of the boxless loudspeaker has a rectangular portion and a triangular portion.

10. The vehicle of claim 9, wherein the triangular portion forms an end of the boxless loudspeaker.

11. The vehicle of claim 3, wherein at least a portion of the boxless loudspeaker is laterally spaced from the outer surface of the door panel, such that a reference line, extending perpendicular to a major longitudinal axis of the vehicle intersects the outer surface of the door panel, passes through the cargo space, and then intersects the boxless loudspeaker.

12. The vehicle of claim 2, comprising an exterior wall with a first end directly connected to the outer surface of the door panel and a second end directly connected to a bottom of the boxless loudspeaker.

13. The vehicle of claim 12, wherein the exterior wall is curved and the boxless loudspeaker is flat.

14. The vehicle of claim 13, wherein a top surface of the second end is flat.

15. The vehicle of claim 12, wherein at least a portion of the boxless loudspeaker exclusively contacts the exterior wall.

16. The vehicle of claim 13, wherein at least a portion of the cargo space is defined directly between the exterior wall and the outer surface of the door panel.

17. The vehicle of claim 3, wherein the boxless loudspeaker is parallel to the door panel.

* * * * *